United States Patent [19]

Burke et al.

[11] Patent Number: 4,803,646

[45] Date of Patent: Feb. 7, 1989

[54] ELECTRONIC ODOMETER

[75] Inventors: Michael J. Burke, Detroit; Richard A. Pidsosny, Canton; Gerald J. Lehner, Westland, all of Mich.

[73] Assignee: Ford Motor Company, Dearborn, Mich.

[21] Appl. No.: 89,466

[22] Filed: Aug. 26, 1987

Related U.S. Application Data

[62] Division of Ser. No. 656,626, Oct. 1, 1984, Pat. No. 4,710,888.

[51] Int. Cl.$^4$ .............................................. G01C 22/00
[52] U.S. Cl. ...................................... 364/561; 73/490; 73/491; 235/95 R; 324/171; 324/172; 377/24.1
[58] Field of Search ............... 73/490, 491; 235/95 R; 324/171, 172; 364/561; 377/24.1

[56] References Cited

U.S. PATENT DOCUMENTS

| | | | |
|---|---|---|---|
| 3,801,005 | 4/1974 | Pniewski | 235/131 R X |
| 3,886,515 | 5/1975 | Cottin et al. | 364/449 X |
| 4,158,172 | 6/1979 | Boyer et al. | 324/166 |
| 4,234,926 | 11/1980 | Wallace et al. | 364/551 |
| 4,236,215 | 11/1980 | Callahan et al. | 364/436 |
| 4,267,569 | 5/1981 | Baumann et al. | 364/424 X |
| 4,271,402 | 6/1981 | Kastura et al. | 364/424 X |
| 4,284,882 | 8/1981 | Woodward | 235/139 R X |
| 4,287,504 | 9/1981 | Simon et al. | 340/521 X |
| 4,317,106 | 2/1982 | Hüber et al. | 364/561 X |
| 4,409,663 | 10/1983 | Becker et al. | 364/561 |
| 4,539,641 | 9/1985 | Kawashimo et al. | 364/424 |
| 4,630,293 | 12/1986 | Dubuisson et al. | 377/24 |
| 4,642,787 | 2/1987 | McCarthy et al. | 364/561 |
| 4,665,497 | 5/1987 | Yamamura et al. | 235/95 R X |
| 4,682,287 | 7/1987 | Mizumo et al. | 364/561 |

OTHER PUBLICATIONS

"7033 336 BIT (21×16) Word Alterable ROM" Spec. Sheets by NCR.
"NC7033 MNOS EAROM 21×16 (336 BIT)" Spec. Sheets by Nitron, Inc.

Primary Examiner—Parshotam S. Lall
Assistant Examiner—Edward R. Cosimano
Attorney, Agent, or Firm—Paul K. Godwin, Jr.; Clifford L. Sadler

[57] ABSTRACT

A system for measuring distance traveled by a vehicle periodically updates the accumulated measurements, displays the updated measurements and electronically stores corresponding accumulations of updated distance data in a non-volatile memory device. The system employs a method of reading through the sequentially ordered storage locations of the non-volatile memory to determine the most recently stored correct data value as a value to be both displayed and used as a base value for subsequent measured distance accumulation.

6 Claims, 6 Drawing Sheets

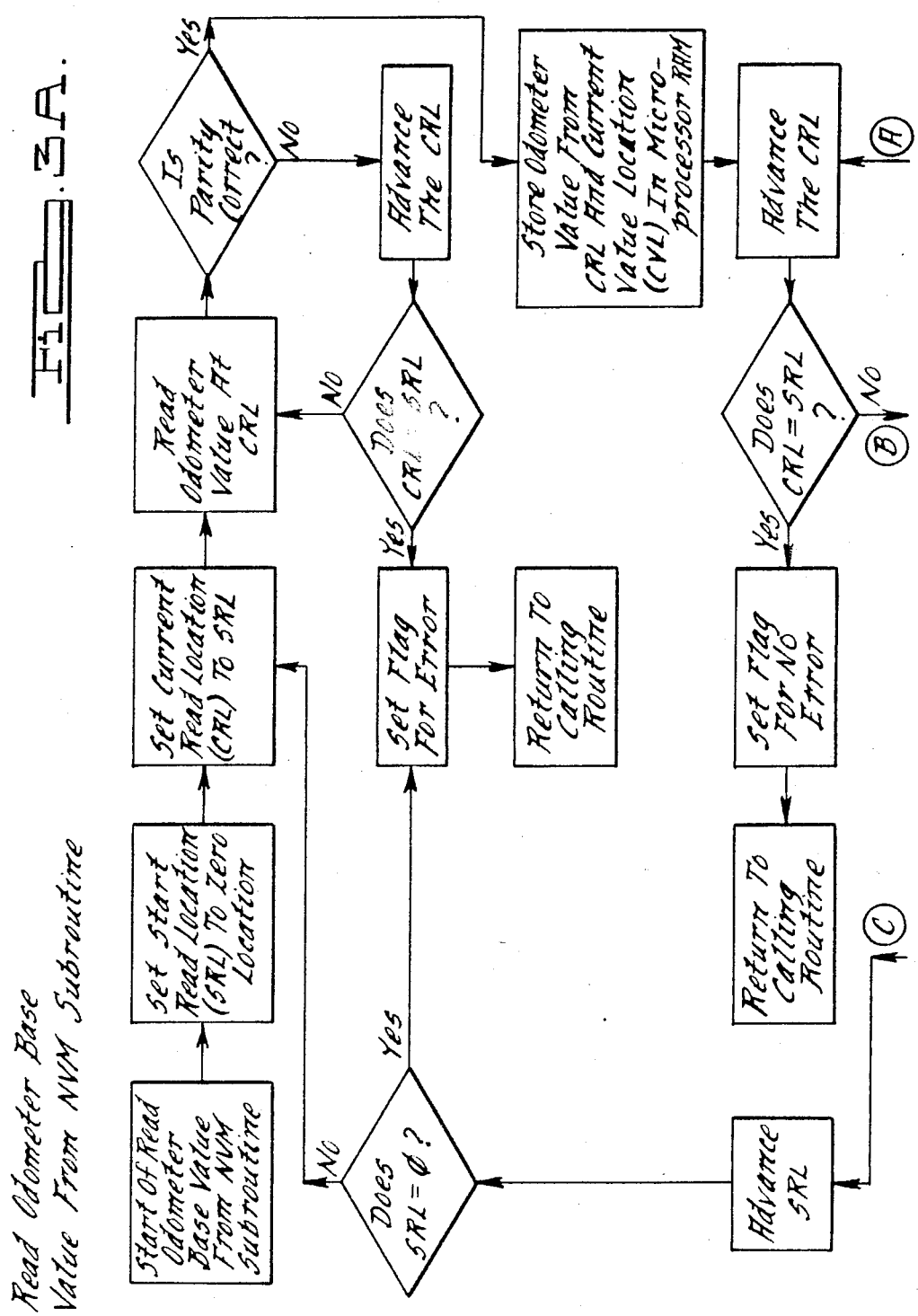

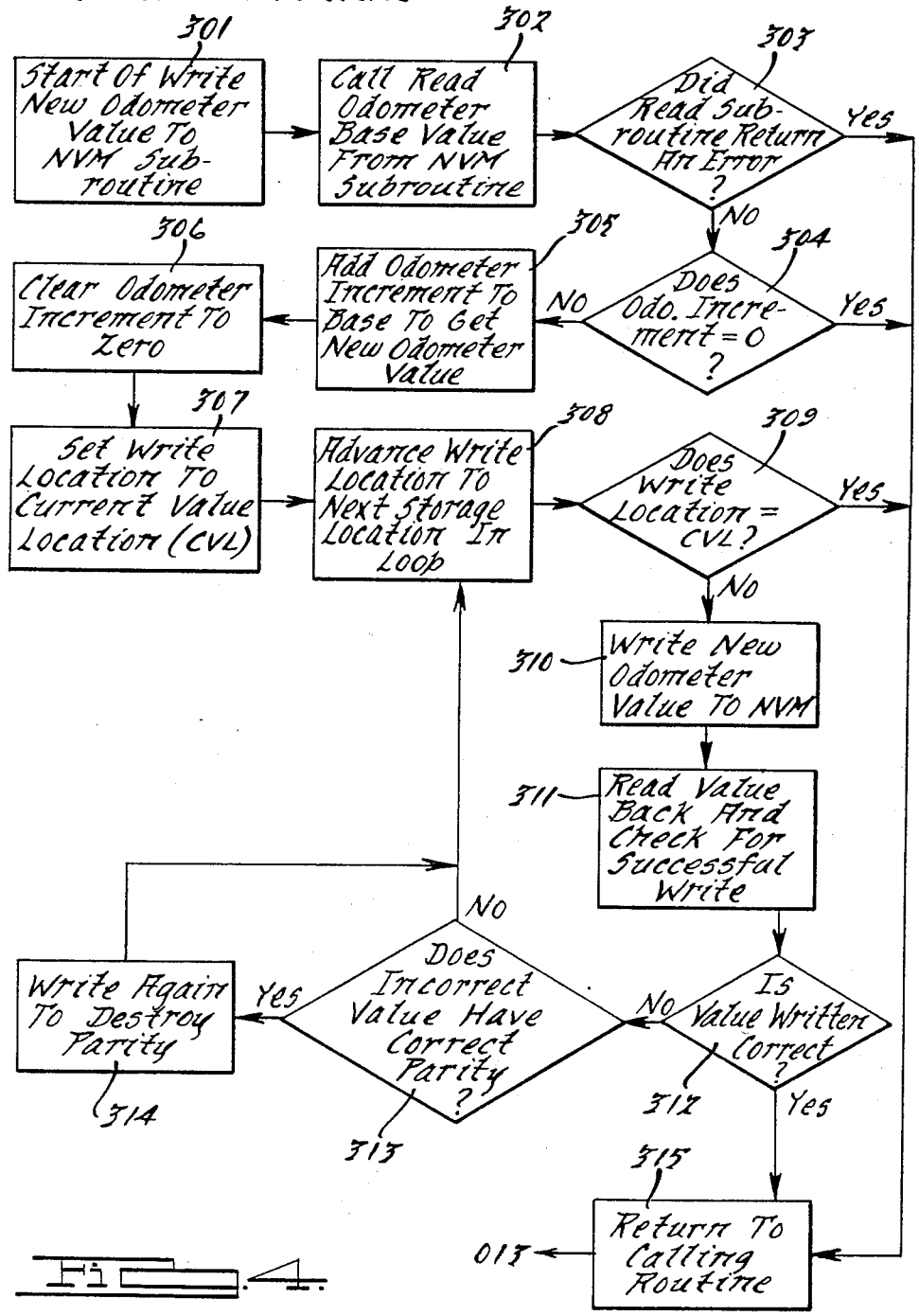

ELECTRONIC ODOMETER

This is a continuation of application Ser. No. 656,626, filed Oct. 1, 1984 U.S. Pat. No. 4,710,888.

BACKGROUND OF THE INVENTION

1. Field of the Invention

The present invention is directed to the field of electronic storage of data and more particularly to that field applied to the area of measuring and storing data reflecting the distance traveled by a vehicle over its life.

2. Description of the Prior Art

Conventional odometers, as used in motor vehicles, have consistently employed mechanical accumulators such as are disclosed in U.S. Pat. Nos. 3,801,005 and 4,284,882. In each of those odometers, a gearing mechanism provides a scaled relationship between the linear distance traveled by a rotating vehicle wheel and the viewable number wheels. The odometer gear train is connected to drive a plurality of number wheels that are interrelated to count and permanently record the number of units (miles or kilometers) of distance traveled by the vehicle.

In more recent years, the trend has been to provide electronically activated digital readouts of critical information in a vehicle in the form of vacuum fluorescent or liquid crystal display systems. A digital speedometer is disclosed in U.S. Pat. No. 4,158,172 in which a pulse generator is employed to provide a known number of pulses per unit of distance traveled by the vehicle. Associated circuitry analyzes the rate at which the pulses are produced and provides appropriate signals to a vacuum fluorescent display to provide a visible digital indication of the speed of the vehicle. Continuous sampling allows for the speedometer to update the display when a new speed value is detected and measured over a plurality of consecutive measurements.

In U.S. Pat. No. 4,317,106 an electronic device is indicated in which a similar speed sensing device is employed for measuring the wheel rotational speed of a vehicle and providing information which can be displayed in terms of distance that the vehicle has traveled since the system was reset. However, such a device is only intended as an auxiliary distance measuring device and would not be suitable for use as an odometer that permanently stores the accumulated distance the vehicle has traveled over its life, since there is no facility for permanently storing the distance values as they are accumulated.

SUMMARY OF THE INVENTION

The present invention utilizes a unique configuration to achieve the desired condition of providing the permanent storage of accumulated distance measurements, while providing the desirable display features associated with conventional electronic mileage measuring devices.

A non-volatile memory device is used which has the ability of storing charge in addressable bit cell locations that are arranged in a repeatable sequential loop. A microprocessor is at the heart of the system and functions to read a speed sensor input, provide frequent updates of distance increments to a digital display and provide less frequent updates to the non-volatile memory device at periodic accumulations of distance increments. In addition, a power control circuit is associated with the microprocessor which provides power to the microprocessor when the vehicle ignition is switched from on to off. In this manner, the microprocessor is allowed time to update the non-volatile memory with any accumulated measurement values since the last update.

In order to obtain the correct value from the non-volatile memory that indicates the accumulated distance traveled by the vehicle each time the vehicle is turned on, the microprocessor is programmed so as to read the data values contained in each of the storage locations of the non-volatile memory. Each read value is assessed to first determine if the read value has correct parity and to secondly determine the quantity relationship of the read value to other values read from other locations in the non-volatile memory. Once the correct value is read from the non-volatile memory and meets all the criteria, it is used a a base value for subsequent adding of measured distance increments and display of the accumulated odometer value. In the present invention, the display of the base odometer value is incremented for each predetermined portion of a unit ("0.1" kilometer or "0.1" mile) after the distance sensor has provided a sufficient number of pulses to indicate the increment has been measured.

In order to preserve the life of the non-volatile memory, the number of the erase/write cycles has been minimized by providing updates to the non-volatile memory that correspond to increases of 15.36 km (approximately 10 miles) through a write method which will be described in detail later. The write method is structured so as to avoid erasing the value of data stored in the non-volatile memory location corresponding to that location from which the base value was read. In addition, the write method provides for error checking whereby each new odometer value written to the non-volatile memory is read and compared with that which was written into that storage location. In the event the comparison indicates an inequality, and the associated parity value indicates an equality, the method attempts to write an erroneous value and an erroneous parity into that location so that it will not be mistakenly read as a valid value during the read method.

BRIEF DESCRIPTION OF THE DRAWINGS

FIGS. 3a and 3b together form a flow diagram illustrating the sub-routine used to read the odometer base value from the non-volatile memory (NVM) in the present invention.

FIG. 4 is a flow diagram illustrating the sub-routine used to write each new, odometer value to the NVM in the present invention.

FIG. 5 is a flow diagram illustrating the main program as utilized in the microprocessor of the present invention.

DETAILED DESCRIPTION OF THE PRESENT INVENTION

Figure 1:
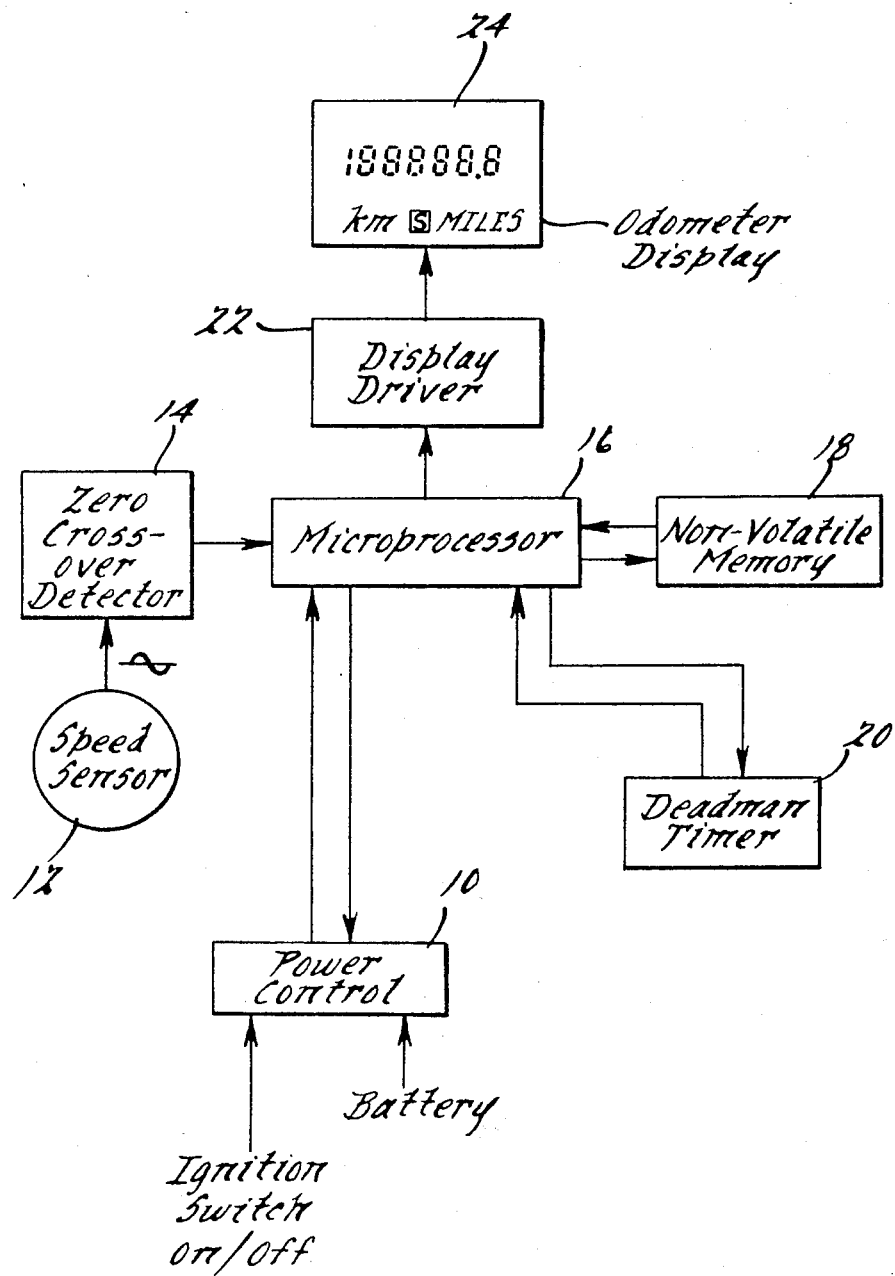
FIG. 1 is a block diagram illustrating the relationship of the various elements employed in the present invention.

The electronic odometer of the present invention is illustrated in FIG. 1 as including a speed sensor 12 which is implemented as a conventional transmission mounted variable reluctance sensor that produces a sine wave calibrated to be approximately 8,000 cycles per mile (1.6 km). This is equivalent to approximately one cycle for every eight inches (20.3 cm) of vehicle travel. The sine wave output from the speed sensor 12 is connected to a zero crossover detector 14 which converts the sine wave to a square wave of approximately 16,000 cycles per mile (1.6 km). A microprocessor 16 is programmed to provide output data to a display driver 22 that formats the data to activate specific elements of an odometer display 24. The odometer display 24 includes six 7-segmented digits and one 2-segmented digit to provide a display of accumulated distance up to 199999.9 units (kilometers or miles). The odometer display 24 also includes indicia to reflect the measurement units being displayed. A service symbol of an "S" surrounded by a rectangle is also provided to indicate a substitution of the non-volatile memory element 18 for that which accompanied the vehicle from the manufacturer.

The non-volatile memory (NVM) element employed in the described preferred embodiment is a metal-nitride oxide semiconductor (MNOS) designated as an NC7033 EAROM by its manufacturer —NCR Corporation. Data retention is defined as the time data will remain valid in the NVM between erase/write cycles. It has been found that the data retention is inversely related to the number of erase/write cycles performed and that an excessive number of such cycles will overstress the nitride layer and diminish this particular NVM's ability to retain data.

Data retention is typically 8 to 12 years when erase/write cycles are less than 5,000. With less than 12,000 erase/write cycles, the retention is typically 4 to 6 years Data retention is not predictable when erase/write cycles exceed 10,000.

Given the considerations of the particular NVM used in the preferred embodiment, the present invention is contructed to minimize the number of erase/write cycles over the life of the vehicle in order to maximize the data retention. This also insures that even with failure of some other component in the electronic odometer, the measured distance between erase/write cycles will not be so excessive as to lose a significant measurement of distance.

The microprocessor 16 is implemented in the preferred embodiment in the form of an MC6805/R2 available from Motorola, Inc. The microprocessor 16 is programmed to process the input signals from the zero crossover detector 14, to compute the accumulated measurement values for the odometer display and provide measurement updates to the non-volatile memory at predetermined increments. The microprocessor 16 is also programmed to utilize the non-volatile memory 18 as a backup device with respect to its internal random access memory (RAM).

A deadman timer 20 is utilized to reset the microprocessor 16 in the event a long period of time elapses between microprocessor functions that indicate erroneous operation of the microprocessor. The function of the deadman timer 20 is conventionally included to provide a reset to all the microprocessor functions and allow it to restart its operations.

The display driver 22 functions to receive the output data signals of the microprocessor and to energize the appropriate display segments in the odometer display 24. The display driver 22 acts as a decoder and in the preferred embodiment is implemented as a 4-bit microprocessor designated as HMCS43 by Hitachi, Ltd.

Figure 2:
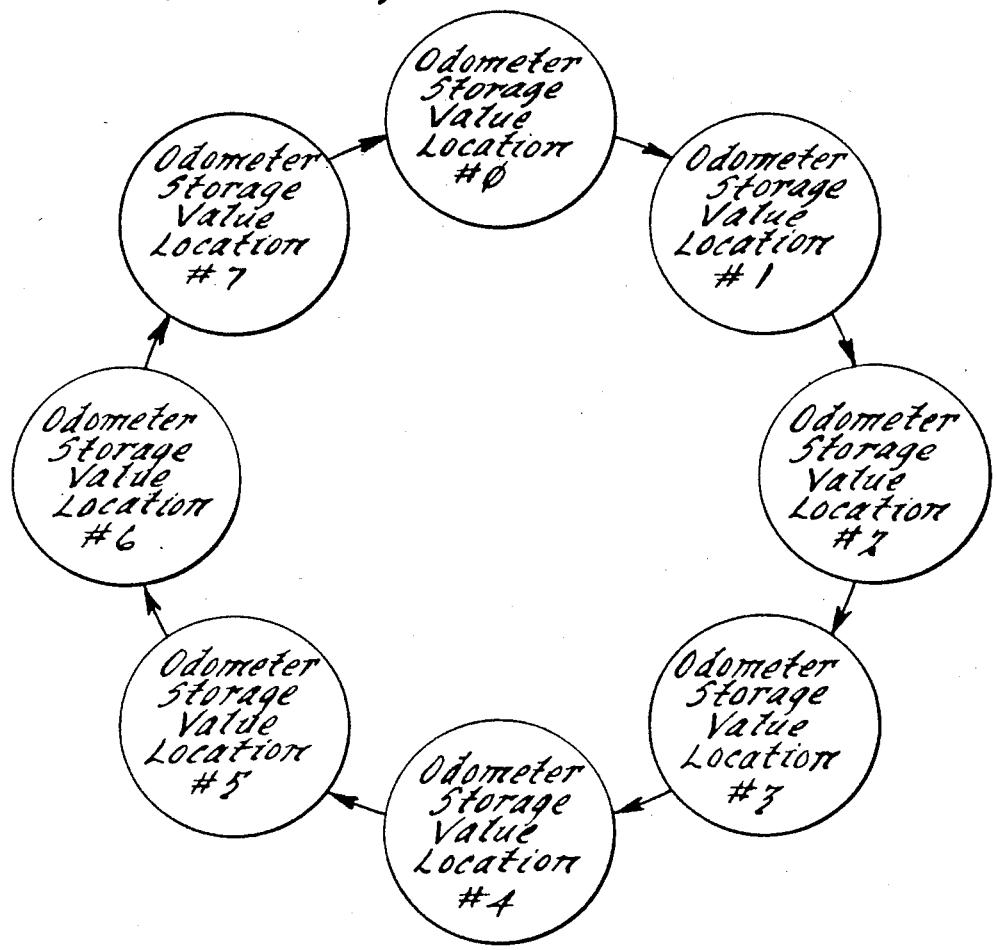
FIG. 2 is a conceptional diagram illustrating the storage location loop of the non-volatile memory employed in the present invention.

The addressing sequence for the eight 32-bit storage locations in the non-volatile memory (NVM) 18 is shown in FIG. 2. The layout indicates that the individually addressable locations #0-#7 are sequential and form a loop whereby location #0 follows location #7. The purpose of the loop arrangement is to minimize the number of erase/write cycles to any particular location in the NVM and thus maximize the length of data retention. Therefore, a multiple number of odometer values will be stored in the NVM at various locations. The read method has to determine which value is the appropriate one to be used as the base odometer value for display and subsequent accumulation of distance measurements.

The main program for the microprocessor 16 is illustrated in FIG. 5 and commences after the vehicle ignition is turned on at 001. Immediately, the sub-routine method is called at 002 to read the base odometer value from the NVM.

Figure 3B:
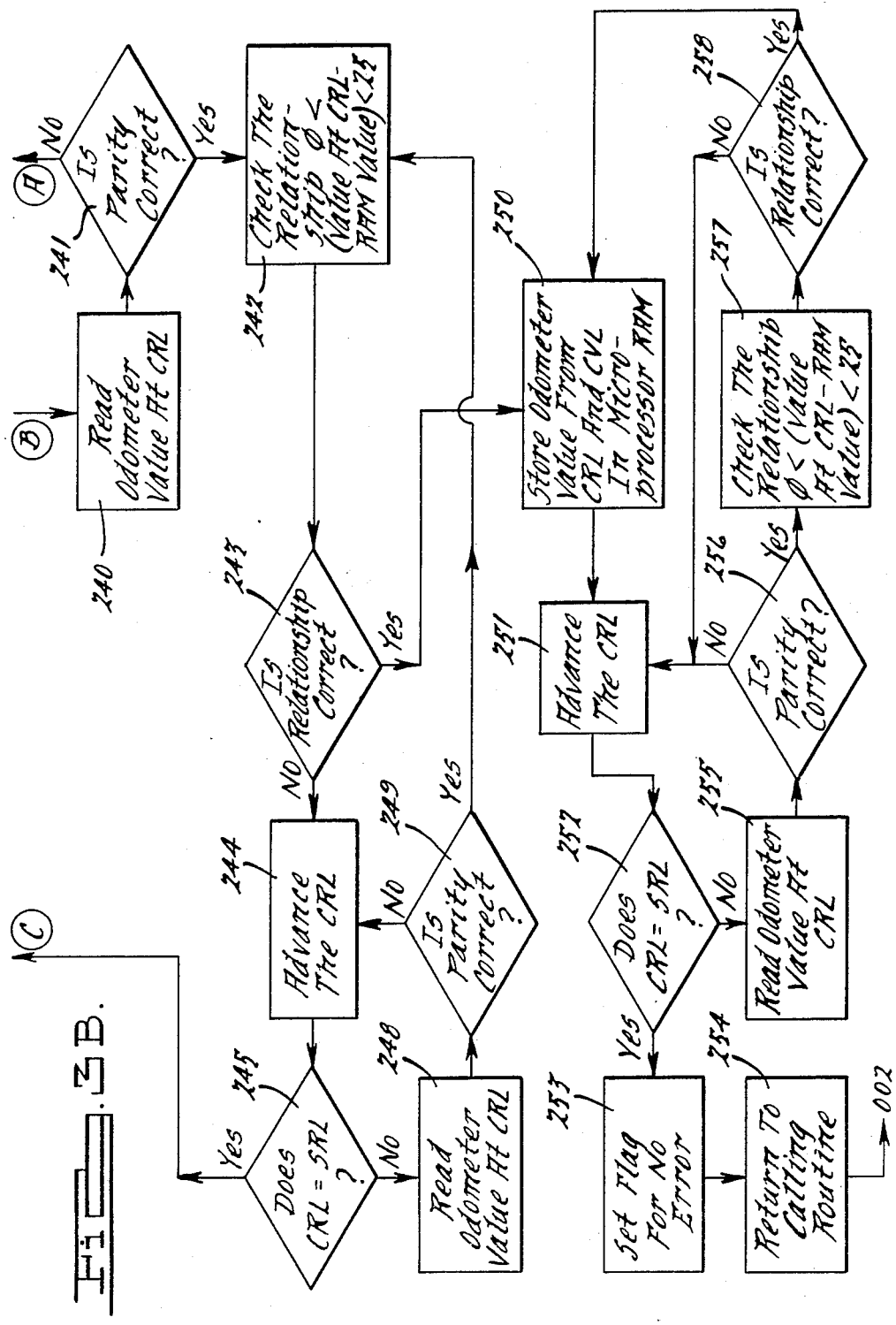
Figure 9:
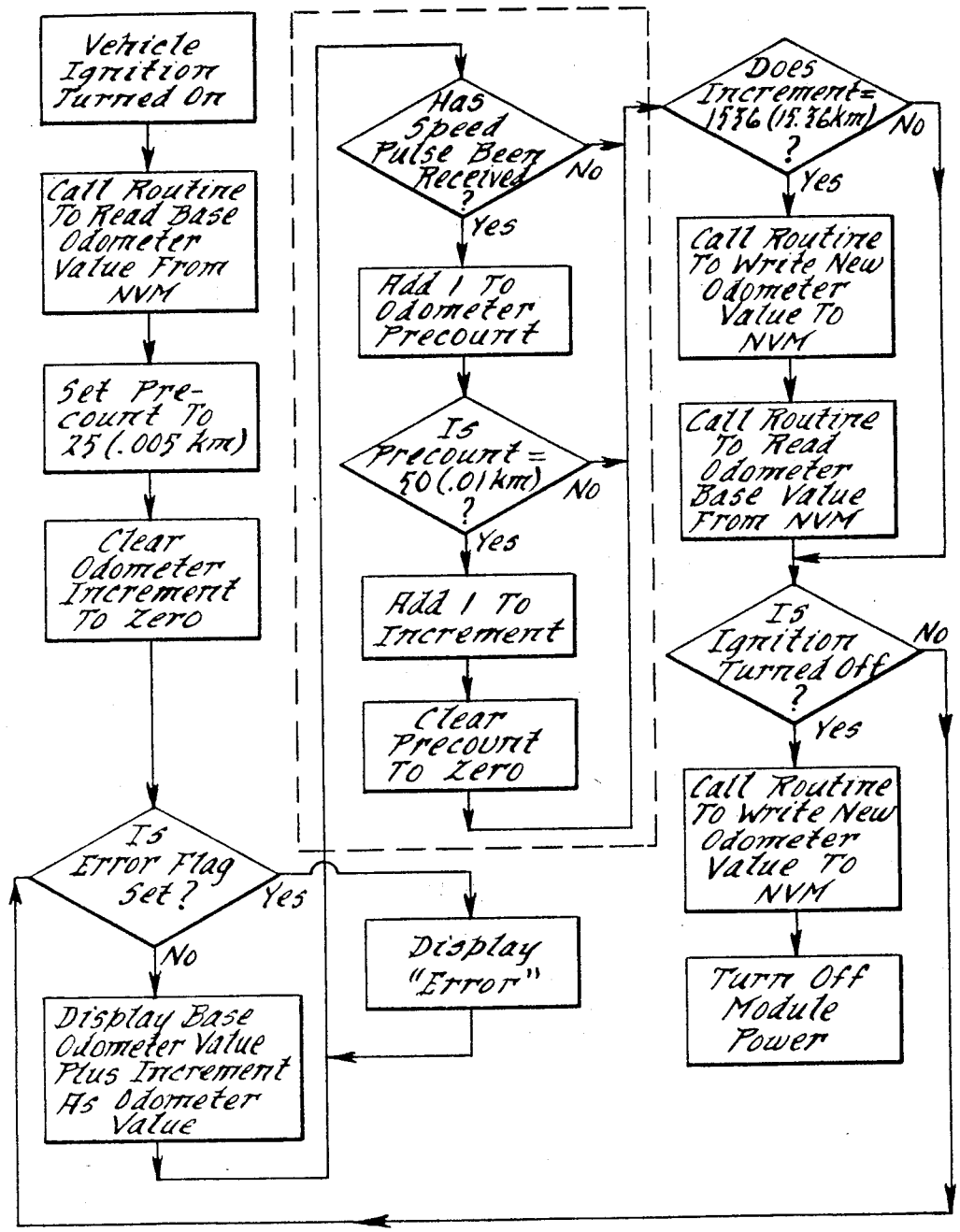

FIGS. 3A and 3B illustrate the sub-routine called at 002 for reading the odometer base value from the non-volatile memory. In that sub-routine, a start read location (SRL) is set to the 0 location of the NVM in instruction 221. A current read location (CRL) is set to match the start read location in instruction 222. The odometer value at the current read location is read at 223 and its three parity bits of the 32 bit word are compared at 224 with the correct parity to determine if the odometer value read at the current read location has correct parity. If the parity is not correct, the current read location is advanced at 225 to the next storage location of the NVM. If the advanced current read location is not equal to the start read location when compared at 226, the odometer value is then read at that advanced current read location at 223 and the parity is again compared at 224. If no parity correct values are read from the NVM over the entire loop, an error flag is set at 227 when the current read location again equals the start read location at 226. The sub-routine then returns at 228 to the calling routine 002 in the main program.

On the other hand, when a value at a particular current read location is read at 223 and its parity at 224 is correct, that odometer value and the location of the current value (CVL) are stored at 230 in the microprocessor's internal RAM (temporary storage). The current read location is advanced at 231 and then compared at 232. If the current read location is compared at 232 is not yet equal again to the start read location, at 240 (Refer to path "B" from 232 in FIG. 3A to 240 in FIG. 3b), the odometer's value is read at the current read location. If the parity is not correct at 241, the current read location in the NVM is again advanced at 231 (Refer to path "A" from 241 in FIG. 3B to 231 in FIG. 3A), the current read location is compared at 232, the value is read at 240 and the parity is compared at 241 until the current read location is again equal to the start read location or a second odometer value is read that has correct parity.

If the current read location is advanced to the start read location and so determined at 232, the flag is set for "no error" at 234 and the sub-routine then returns at 235 to the calling routine 002 in the main program (FIG. 5).

If a second odometer value is read at 240 that has correct parity at 241, its relationship to the odometer value stored in the microprocessor RAM is checked at 242. The predetermined relationship must be such that the most recent odometer value read at the current read location minus the odometer value stored in the microprocessor RAM must be less than 25 miles (38 km) but greater than 0. In the present invention, the NVM is updated or written with new odometer values at accumulated increments of approximately 10 miles or whenever the ignition is switched off. Therefore, if a particular location in the NVM contains faulty data, the relationship established in the read sub-routine method allows for the system to obtain an odometer value that is still within an acceptable degree of accuracy.

In FIG. 3B, after the relationship is checked at 242, a determination is made as to whether the relationship is correct or not at 243. If the relationship is correct, (i.e., the second odometer value read at the current read location is not more than 25 miles greater than the previous value stored in the microprocessor RAM) the second odometer value and its location value are substituted at 250 into the microprocessor RAM for the value that was earlier stored. Until the current read location has been advanced to the start read location and verified at 252, the steps of advancing at 251, reading the value at 255 and parity checking at 256, as well as checking the relationships of validly read odometer values at 257, are repeated through the "NO" path of 258. If subsequent odometer values are read at 255 which have correct parity at 256 and acceptable relationships at 257/258 to the values stored in the microprocessor RAM, then each of those values are substituted for the one previously stored at 250. When the current read location is advanced at 251 to the start read location as determined at 252, the error flag is set to "no error" at 253 and the read routine returns at 254 to the calling routine 002 in the main program (FIG. 5). At that time, the value stored in the microprocessor RAM corresponds to the correct base odometer value used for subsequent calculations and display.

It should be pointed out that if the second parity correct odometer value read at 240 is outside the relationship determination at 242/243 the read sub-routine, will cause the current read location to be advanced at 244 and the value read at 248 for each location until the current read location is determined at 245 to be equal to the start read location or another correct value is read with correct parity at 249. The relationship of that parity correct value is then checked against the value stored in RAM at 242 to determine if the stored value should be replaced. If the current read location, as advanced at 244, is found to equal the start read location at 245 before a second value is read that has the correct relationship as determined at 242/243, the program advances the start read location at 246 (refer to path "C" from 245 in FIG. 3B to 246 in FIG. 3A). In this manner, the read subroutine searches through the NVM, but starts at the next location and again sequences through the steps described above from 222. This is continued until the second read odometer value described above becomes the first value then stored in the microprocessor RAM and the first read odometer value described above becomes that which has its relationship compared with the value then stored in the microprocessor RAM. If at that time, the relationships are correct, the substituted value is accepted as the base odometer value and the read routine is returned to the main program at 235. However, if even after the routine has been repeated until such time as the start read location is again read at 247 to be equal to its initial zero location and no correct relationship comparisons have been made, an error flag is set at 227 to indicate a malfunction. Otherwise an erroneous reading would be displayed by the odometer.

Referring again to FIG. 5, after the base odometer value has been read from the NVM at 002, a precount register is set to 25 counts (0.005 km) at 003 and the odometer increment register is cleared to zero at 004.

(The precount register is initialized at 003 to 0.005 km to compensate for any loss of distance which may have occurred due to the dropping of the least significant data bits when values are written into the NVM subsequent to when the vehicle was previously turned off.)

If the error flag is not set at 005, the increment value is added to the base odometer value at 006 to obtain a summation value that is displayed as the odometer value. However, if the error flag is set at 005, an "ERROR" signal is displayed at 018 and the routine continues.

Whenever a pulse is received from the crossover detector 14, that occurrence is affirmed at 007 and a single count is added to the odometer precount at 008. If no pulse is received, no count is added to the precount register and the routine advances to 012. When the precount register accumulates 50 counts (0.01 km) and it is affirmed at 009 a single count is added to the increment register at 010. The precount register is then cleared to zero at 011. If the precount register has accumulated less than 50 counts, no count is added to the increment register and the routine advances to 012. Until the increment register reads 1536 counts as checked at 012, the routine bypasses the Write routine which updates the NVM. When the increment register accumulates 1536 counts (15.36) km or approximately 10 miles) at 012 the sub-routine is called at 013 which writes a new odometer value to the non-volatile memory.

The write routine called at 013 and shown in the flow diagram in FIG. 4 begins at 301 and 302 by calling up the read odometer base value from NVM read sub-routine described above. If it is determined at 303 that an error flag is set, the write subroutine is returned at 315 to the Main Program at 013. However, if the read subroutine did not return an error, as determined at 303, and the odometer increment register is not equal to 0, as determined at 304, the odometer increment is added to the base odometer value at 305 to get a new odometer value. (If the odometer increment was determined at 304 to be 0, of course no increment is added to the base value and the subroutine returns to the Main Program at 013.) The increment register is then cleared to zero at 306. A write location is set at 307 to be equal to the current value location that is stored in the microprocessor RAM with the base odometer value. In order to make sure that the value stored in that location is not destroyed, the write location is advanced at 309 to the next storage location in the loop of the NVM. If the advanced write location does not equal the current value location at 309, the new odometer value is then written at 310 into the NVM at that advanced write location by performing an erase/write cycle. The value written into the NVM is then read back at 311 and checked for accuracy. If the value is correct at 312 as written, the write routine returns back to the main program at 315. In the event that the read back value is not correct at 312, its parity is checked at 313 to determine if that portion corresponds. If the parity is incorrect and value written is incorrect the write location is advanced to the next storage location at 308 and the write sequence is again performed. If the parity is correct but the value written is incorrect, an erase/write cycle at 314 is performed at that location in order to destroy the value present in that location and to write an erroneous parity. Following that sequence, the write location is advanced at 308 to the next storage location in the loop of the NVM and the series of steps 309-312 utilized to write the odometer value is again attempted. These attempts continue until the write location becomes equal to the current value location at 309. At that point the write sub-routine returns to the main program at 315 and the read routine 014 is entered in order to update the microprocessor RAM with the odometer base value from the NVM. If the ignition switch is still on when checked at step 015, the odometer base value read from the NVM at 014 is displayed at 006.

When the vehicle ignition is turned off, power is maintained to the microprocessor 16 through the power control 10. At such time, step 015 causes the write routine to be recalled at 016 and anything stored in the increment register is added to the base odometer value. The sum becomes the new odometer value that is written into the NVM. When the ignition is off and the write routine is completed, step 017 causes the power control 10 to extinguish power to the system. The bit size of the data stored in this NVM does not allow for storage of values that give a resolution greater than 0.1 km. Therefore, when the ignition is turned off, the precount accumulation is lost. Accordingly, the precount is set to 25 or an equivalent of 0.005 km when the vehicle ignition is turned back on to provide a compensation for what is deemed to be the average value that is lost over the life of the vehicle. It is expected that a random normal distribution for the loss of distance measurements at power down will cancel over the life of the vehicle.

It will be apparent that many modifications and variations may be implemented without departing from the scope of the novel concept of this invention. Therefore, it is intended by the appended claims to cover all such modifications and variations which fall within the true spirit and scope of the invention.

We claim:

1. An electronic odometer for an automotive vehicle comprising:
    sensor means on said vehicle for detecting movement of said vehicle and providing an output signal indicative of predetermined portions of distance traveled;
    computer means connected to said sensor means for accumulating said output signals from said sensor means into predetermined increments of distance and outputting an odometer data value as the summation of all increments of distance said vehicle has traveled;
    memory means, connected to said computer means, having a plurality of non-volatile and individually addressable locations each one having the capacity for storing an odometer data value corresponding to a summation of all predetermined increments of distance traveled by said vehicle along with predetermined parity codes; and
    means connected to said computer means for displaying the odometer data value for visual observation within said vehicle,
    said computer means programmed to read the most recently written parity correct odometer data value stored in one of the separately addressable locations of said non-volatile memory means as a base value, to accumulate data values from said sensor means output signal until each time an accumulated data value equals a predetermined increment of distance value to accumulate the occurrences of said accumulated data values equaling said predetermined increment of distance value, to sum the value of said accumulated increment occurrences and the base value read from said non-volatile memory means as the newest odometer data value, to write said newest odometer data value and a predetermined parity code to one of the individually addressable locations of said non-volatile memory means having an address that is different from that of the location containing the most recently stored odometer data value, whenever said newest odometer data value exceeds said base value by a predetermined amount that is greater than said predetermined increment, and whenever said newest odometer data value exceeds the most recently written odometer data value by said predetermined amount.

2. An electronic odometer as in claim 1 wherein said vehicle includes an ignition switch that is turned on during the operation of said vehicle and said computer means is also programmed to write said newest odometer data value and a predetermined parity code to one of the individually addressable locations of said non-volatile memory means having an address that is different from that of the location containing the most recently stored odometer data value, when said ignition switch is turned off.

3. An electronic odometer as in claim 1, wherein said addressable storage locations in non-volatile memory means are arranged in a repeatable ordered sequence so that when the last location in a sequence is addressed, the next location is the first location in that sequence.

4. An electronic odometer as in claim 3, wherein said computer means also performs said summing function whenever the vehicle is turned off.

5. An electronic odometer as in claim 4, wherein said computer means performs said read function and provides an error signal to said display means, in the event it cannot determine the most recently stored parity correct odometer data value stored in said non-volatile memory means, to indicate malfunction in said odometer.

6. An electronic odometer as in claim 5, wherein said computer means performs said read function by addressing each storage location in said non-volatile memory means and comparing each read data value having correct parity with previously read data values to determine the highest value, within a predetermined maximum difference, as the most recently stored odometer data value for said base value.

* * * * *